US008425635B2

(12) United States Patent
Johal et al.

(10) Patent No.: US 8,425,635 B2
(45) Date of Patent: Apr. 23, 2013

(54) SYSTEMS, METHODS AND COMPOSITIONS RELATING TO COMBUSTIBLE BIOMATERIALS

(75) Inventors: Sumer Johal, Walnut Creek, CA (US); Nicholas Carlin, Bay Point, CA (US); Pauravi Shah, San Francisco, CA (US); John J. McNamara, El Sobrante, CA (US)

(73) Assignee: AGNI Corporation (Cayman Islands), George Town, Grand Cayman (KY)

( * ) Notice: Subject to any disclaimer, the term of this patent is extended or adjusted under 35 U.S.C. 154(b) by 0 days.

(21) Appl. No.: 12/941,023

(22) Filed: Nov. 5, 2010

(65) Prior Publication Data

US 2011/0258919 A1 Oct. 27, 2011

Related U.S. Application Data

(60) Provisional application No. 61/326,998, filed on Apr. 22, 2010.

(51) Int. Cl.
*C10L 5/00* (2006.01)
*C10L 9/02* (2006.01)
*C10L 9/08* (2006.01)

(52) U.S. Cl.
USPC .................... 44/606; 44/605; 201/7

(58) Field of Classification Search ........ 201/7
See application file for complete search history.

(56) References Cited

U.S. PATENT DOCUMENTS

| 2,382,568 | A | * | 8/1945 | Karim ..................... 264/115 |
| 4,076,579 | A |   | 2/1978 | Bring |
| 4,497,637 | A |   | 2/1985 | Purdy et al. |
| 5,395,455 | A |   | 3/1995 | Scott et al. |
| 6,855,180 | B1 | * | 2/2005 | Pinatti et al. ................ 44/307 |
| 2001/0013197 | A1 |   | 8/2001 | White |
| 2007/0006528 | A1 |   | 1/2007 | Diebold et al. |
| 2007/0117195 | A1 |   | 5/2007 | Warner et al. |
| 2008/0280236 | A1 |   | 11/2008 | Wright |
| 2008/0307703 | A1 | * | 12/2008 | Dietenberger et al. .......... 48/76 |
| 2009/0007484 | A1 |   | 1/2009 | Smith |

FOREIGN PATENT DOCUMENTS

| WO | WO 2007145507 A2 * | 12/2007 |
| WO | 2009/003920 | 1/2009 |
| WO | WO 2009003920 A1 * | 1/2009 |

OTHER PUBLICATIONS

NREL (Potassium content in biomass) Sep. 1, 2006.*
On the Properties of washed Straw by Jenkins et al. Biomass and Bio Energy vol. 10 No. 4 pp. 177-200 (1996).*
"Removal of K and Cl by leaching of straw char" by Jensen et al Biomass and Energy 20 (2001) 447-457.*
TG FTIR Study of the Influence of Potassium Chloride on Wheat Straw Pyrolysis Energy and Fuels (1998) 12, 929-938.*
Johal, Sumer, PCT Application No. PCT/2010/061171 Int'l filing date Dec. 17, 2010, International Search Report dated Jun. 14, 2011.

(Continued)

*Primary Examiner* — Pamela H Weiss
(74) *Attorney, Agent, or Firm* — EcoTech Law Group, P.C.

(57) ABSTRACT

A composition of biomass material is disclosed. The composition includes: (i) a lignocellulosic material; and (ii) at least one member selected from a group consisting of potassium, sodium and chlorides, wherein said at least one member comprising not more than about 0.01% (by weight) of said composition. The composition may not include more than 10% of water.

3 Claims, 8 Drawing Sheets

OTHER PUBLICATIONS

Johal, Sumer, PCT Application No. PCT/2010/061171 Int'l filing date Dec. 17, 2010, Written Opinion dated Jun. 14, 2011.

Johal, Sumer, U.S. Appl. No. 12/941,017, filed Nov. 5, 2010, Entitled "Systems, Methods and Compositions Relating to Combustible Biomaterials".

Johal, Sumer, U.S. Appl. No. 12/941,022, filed Nov. 5, 2010, Entitled "Systems, Methods and Compositions Relating to Combustible Biomaterials".

Johal, Sumer, U.S. Appl. No. 12/941,013, filed Nov. 5, 2010, Entitled "Systems, Methods and Compositions Relating to Combustible Biomaterials".

Jensen and Dam-Johansen et al., "TG-FTIR Study of the Influence of Potassium Chloride on Wheat Straw Pyrolysis" *Energy & Fuels* 1998, 12, 929-938.

Jensen et al., "Removal of K and Cl by leaching of straw char", *Biomass and Bioenergy* 20 (2001) 447-457.

Jenkins et al., "On the properties of Washed Straw", *Biomass and Bioenergy*. vol. 10. No. 4, pp. 177-200, 1996.

Turn et al., "Removal of Inorganic Constituents of Biomass Feedstocks by Mechanical Dewatering and Leaching", *Biomass and Bioenergy* vol. 12, No. 4, pp. 241-252, 1997.

Dayton et al., "Release of Inorganic Constituents from Leached Biomass during Thermal Conversion", *Energy & Fuels* 1999, 13, 860-870.

Turn et al., "Leaching of Alkalis in Biomass Using Banagrass as a Prototype *Herbaceous* Species", Final Report Prepared for National Renewable Energy Laboratory, NREL Subcontract XCF-5-14326-01 Dec. 2003.

Thomas Gamse, "Lecture on Extraction", Department of Chemical Engineering and Environmental Technology Graz University of Technology Apr. 27, 2009.

Li et al., "Torrefaction of Sawdust in a Fluidized Bed Reactor" Bioresource Technology 103 (2012) 453-458.

\* cited by examiner

SYSTEMS, METHODS AND COMPOSITIONS RELATING TO COMBUSTIBLE BIOMATERIALS

RELATED APPLICATION

The application claims priority from U.S. Provisional Application having Ser. No. 61/326,998, filed on Apr. 22, 2010, which is incorporated herein by reference for all purposes.

BACKGROUND OF THE INVENTION

1. Field of the Invention

The present invention relates generally to production of combustible biomaterials. More particularly, the present invention relates to novel systems, methods, and compositions relating to production of combustible biomaterials from one or more different types of agricultural residue.

2. Background of the Invention

High demand for fuel and energy, and a decrease in conventional energy supplies, such as oil and natural gas, are driving exploration of renewable energy sources such as biofuels. Renewable energy sources are desirable because they are available long after conventional energy supplies have been depleted. Specifically, biomass, a resource abundantly and renewably present in nature, is the source for production of biofuels.

In an attempt to harness energy from biomass, conventional systems and methods attempt to burn biomass in biomass-fired combustors at industrial-grade temperatures, typically ranging from 800° C. to 1200° C. Unfortunately, such attempts are futile because biomass treated in this manner simply does not burn. Moreover, high-temperature treatment of biomass according to conventional attempts suffers from certain drawbacks. By way of example, high-temperature treatment of biomass produces ash, which typically includes alkali and alkaline earth chlorides, sulfates, carbonates, and complex silicates, which accumulate on various combustor components, such as tubes carrying solvents for heating.

As another example, at high temperatures inside the combustion chamber, the silicates combine with potassium and sodium to form silica glass chunks, which also accumulate on and clog the provisions for ash disposal.

Such undesirable accumulations of ash and silica glass chunks result in fouling and slagging inside the combustion chamber, eventually leading to a decline in combustor efficiency and capacity. Specifically, heat efficiency during the attempted combustion process is significantly diminished, and restricted flow through the combustor causes mechanical damage. To this end, premature shutdown of the system for maintenance and removal of the accumulated undesired deposits is necessary. As a result, conventional systems and processes realize lower throughput for energy production. More than that, there may well be permanent damage to the combustor (e.g., it may undergo corrosion, or require significant repair, or even replacement). This translates into increased capital costs for the conventional systems and processes, which rely on biomass for energy production.

What is therefore needed are novel systems, methods, and compositions that harness energy from biomass without suffering from the drawbacks encountered by the conventional systems and processes of biomass treatment.

SUMMARY OF THE INVENTION

In view of the foregoing, in one aspect, the present invention provides a method for making combustible biomaterial. The method includes: (i) receiving one or more types of biomass, each of which includes a combustion-retarding material; (ii) rupturing lignocellulose in the one or more types of biomass to produce ruptured biomass including the combustion-retarding material; (iii) washing the ruptured biomass with solvent to drive combustion-retarding materials from the ruptured biomass into the solvent to produce a combustion-retarding-material-enriched solvent and a combustion-retarding-material-depleted ruptured biomass; and (iv) pyrolyzing the combustion-retarding-material-depleted ruptured biomass to produce a combustible biomaterial. At least one of the one or more types of biomass may include at least one member selected from a group consisting of rice straw, sugar cane leaves, cotton stalks, mustard stalks, pine needles, coffee husks, coconut husks, rice husks, mustard husks, weed straw, corn stover, sugar cane bagasse, millet stalks, pulses stalks, sweet sorghum stalks, nut shells, animal manure, guar husk, acacia totalis, julia flora, jatropha residue, wild grass, pigeon beans, pearl millet, barley, dry chili, gran jowar, linseed, maize/corn, lentil, mung bean, sunflower, til, oil seed stalks, pulses/millets, black gram, sawan, soybean stalks, cow gram, horse gram, finger millet, turmeric, castor seed, meshta, sannhamp, and hemp. In certain embodiments of the present invention, rupturing is carried out by crushing or chopping the lignocellulose in the biomass. Preferably, the ruptured biomass including the combustion-retarding material is washed for a time that is between 20 minutes and 60 minutes.

In one embodiment of the present invention, the solvent includes $H_2O$. In preferred embodiments of the present invention, the solvent includes $H_2O$ or $H_2SO_4$. Preferably, the solvent has a pH that is between about 4 and about 7. In preferred embodiments of the present invention, the solvent is maintained at a temperature that is between about 30° C. and about 70° C., and in more preferred embodiments of the present invention the solvent is maintained at about 50° C.

In preferred embodiments of the present invention, the washing includes washing ruptured biomass using recycled solvent. Preferably, recycled solvent is maintained at a temperature of between about 30° C. and about 70° C., and more preferably, the recycled solvent is maintained at a temperature of about 50° C.

In preferred embodiments of the present invention, pyrolyzing is carried out at temperature that is between about 100° C. and about 500° C., and more preferably, pyrolyzing is carried out at a temperature that is between about 250° C. and about 350° C. Pyrolyzing may be carried out in the absence of oxygen. Preferably, pyrolyzing is carried out for a time that is between about 10 minutes and about 24 hours. Inventive methods may further include densifying the combustible biomaterial to produce biocoal. Densifying may be carried out using a pelletizer to produce biocoal pellets.

Inventive methods may further still include soaking the ruptured biomass in the solvent before the washing the ruptured the biomass. Preferably, soaking is carried out at a temperature that is between about 30° C. and about 70° C. Also, preferably, soaking is carried for a duration that is between about 30 minutes and about 60 minutes. Also, preferably, the solvent has a pH that is between about 4 and about 7.

In preferred embodiments, inventive methods also include screw-pressing the combustion-retarding-material-depleted ruptured biomass to squeeze out the residual solvent after washing the ruptured biomass. Other preferred embodiments of the present invention, further still include drying the combustion-retarding-material-depleted ruptured biomass after screw pressing. Drying may include air drying the combustion-retarding-material-depleted ruptured biomass or drying the combustion-retarding-material-depleted ruptured biomass using syngas produced from pyrolyzing, and wherein the syngas includes one member selected from a group consisting of $CO_2$, CO, $CH_4$, and $H_2$.

In another aspect, the present invention provides a method for washing biomass. The method includes: (i) receiving a first discrete amount of biomass; (ii) receiving a second discrete amount of biomass; (iii) washing the first discrete amount of biomass with solvent to produce a first effluent stream enriched with combustion-retarding material; and (iv) washing the second discrete amount of biomass with the first effluent stream to produce a second effluent solvent stream. In one embodiment, the present invention further provides a step of washing the second discrete amount of biomass with the solvent after washing the first discrete amount of biomass with the solvent. Inventive methods may further include washing a third discrete amount of biomass with the second effluent stream to produce a third effluent stream, such that the third effluent stream has a higher concentration of combustion-retarding material than the second effluent stream.

In preferred embodiments of the present invention, the method includes washing different discrete amounts of biomass ranging from a first discrete amount of biomass to an N discrete amounts of biomass, and washing the Nth discrete amount of biomass with an (N−1)th effluent stream, which results from washing (N−1) discrete amounts of biomass, wherein N is a whole number that is greater than 2. Preferably, washing the Nth discrete amount of biomass produces an Nth effluent stream, which has a higher concentration of combustion-retarding material than the (N−1) effluent stream. The Nth effluent stream may be conveyed for effluent treatment.

Inventive methods for producing combustible materials may further still include collecting the first effluent stream in a first collection chamber after washing the first discrete amount of biomass. Further, such methods may include pumping the first effluent stream to a position from where the first effluent stream can be dispensed to wash the second discrete amount of biomass. Similarly, inventive methods may further still include collecting the second effluent stream in a second collection chamber after washing the second discrete amount of biomass. Like the first effluent stream, these methods may further still include pumping the second effluent stream to a position from where the second effluent stream can be dispensed to wash a third discrete amount of biomass.

Unloading the first discrete amount of biomass after the washing the first discrete amount of biomass with the solvent may also be carried out as part of the inventive methods. Further, such methods may include advancing the second discrete amount of biomass to a position, from where washing of the second discrete amount of biomass is carried out, and wherein the step of advancing is performed after washing the first discrete amount of biomass.

In yet another aspect, the present invention provides a method for washing biomass. The method includes: (i) receiving N discrete amounts of biomass, wherein N is a whole number and is greater than 2; (ii) conducting a first washing cycle, which includes washing a first of N discrete amounts of biomass using a solvent to produce a first effluent stream associated with the first washing cycle, washing a second of N discrete amounts of biomass using the first effluent stream associated with the first washing cycle to produce a second effluent stream associated with the first washing cycle and washing other discrete amounts of biomass to satisfy a condition of washing the Nth discrete amount of biomass using an (N−1)th effluent stream associated with the first washing cycle; and (iii) conducting a second washing cycle, which includes washing a second of N discrete amounts of biomass using a solvent to produce a first effluent stream associated with the second washing cycle, washing a second of N discrete amounts of biomass using the first effluent stream associated with the second washing cycle to produce a second effluent stream associated with the second washing cycle and washing other discrete amounts of biomass to satisfy a condition of washing the Nth discrete amount of biomass using an (N−1)th effluent stream associated with the second washing cycle.

Inventive methods of washing biomass may further include conducting an Xth washing cycle, which includes washing an Xth of N discrete amounts of biomass using a solvent to produce a first effluent stream associated with the Xth washing cycle, washing an (X+1)th of N discrete amounts of biomass using the first effluent stream associated with the Xth washing cycle to produce a second effluent stream associated with the Xth washing cycle and washing other discrete amounts of biomass to satisfy a condition of washing the Nth discrete amount of biomass using an (N−X)th effluent stream associated with the Xth washing cycle, where X is a whole number ranging from 3 to N.

In preferred embodiments of the present invention, each of N discrete amounts of biomass is washed with the solvent. Preferably, washing the first discrete amount of biomass is carried out by spraying the solvent on the first discrete amount of biomass. Preferably, the Nth discrete amounts of biomass is washed with a volume of solvent that is between about 0.5 liters and about 4 megalitres. Preferably, the solvent is maintained at a temperature that is between about 30° C. and about 70° C., and more preferably, the solvent is maintained at a temperature that is about 50° C.

In preferred embodiments of the present invention, washing the N discrete amount of biomass includes washing a total of the biomass which weighs between about 1 metric ton and about 1000 metric tons. Preferably, each of the N discrete amounts of biomass weighs between about 1 kg and about 100 metric tons. In preferred embodiments of the present invention, each of the N discrete amounts of biomass is washed with a volume of solvent that is between about 0.5 liters and about4 mega-liters. Preferably, washing the first discrete amount of biomass occurs for a time that is between about 20 minutes and about 60 minutes.

In preferred embodiments of the present invention, the first effluent stream associated with the first washing cycle is maintained at a temperature that is between about 30° C. and about 70° C. More preferably, the first effluent stream associated with the first washing cycle is maintained at a temperature that is about 50° C. In these embodiments, inventive methods further include draining the first effluent stream associated with the first washing cycle into a first collection chamber. Inventive methods may further include a step of pumping the first effluent stream associated with the first washing cycle such that it is dispensed above the second of the N discrete amount of biomass to produce the second effluent stream associated with the first washing cycle. Collecting the second effluent stream into a second collection chamber may be part of the inventive methods of washing biomass.

In one embodiment of the present invention, receiving a first discrete amount of biomass includes receiving in a first bin, the first discrete amount of biomass and receiving a second discrete amount of biomass includes receiving in a second bin, the second discrete amount of biomass.

In yet another aspect, the present invention provides a method for producing combustible biomaterial. The method includes: (i) receiving one or more types of biomass, each of which includes a combustion-retarding material; (ii) washing the biomass with a solvent to drive combustion-retarding materials from the biomass into the solvent to produce a combustion-retarding-material-enriched solvent and a combustion-retarding-material-depleted biomass; (iii) pyrolyzing the combustion-retarding-material-depleted biomass to produce a combustible biomaterial and carbon dioxide; and (iv) drying the combustion-retarding-material-depleted biomass using the carbon dioxide to produce a dried-combustion-retarding-material-depleted biomass. The biomass may include at least one member selected from a group consisting of rice straw, sugar cane leaves, cotton stalks, mustard stalks, pine needles, coffee husks, coconut husks, rice husks, mustard husks, weed straw, corn stover, sugar cane bagasse, millet stalks, pulses stalks, sweet sorghum stalks, nut shells, animal manure, guar husk, acacia totalis, julia flora, jatropha residue, wild grass, pigeon beans, pearl millet, barley, dry chili, gran jowar, linseed, maize/corn, lentil, mung bean, sunflower, til, oil seed stalks, pulses/millets, black gram, sawan, soybean stalks, cow gram, horse gram, finger millet, turmeric, castor seed, meshta, sannhamp, and hemp. Preferably, drying is performed at a temperature that is between about 20° C. and about 50° C.

In preferred embodiments of the present invention, the solvent includes $H_2O$ and in more preferred embodiments the solvent includes $H_2O$ or $H_2SO_4$. The solvent may have a pH that is between about 4 and about 7. Inventive methods may further include a step of rupturing lignocellulose in one or more types of biomass to produce ruptured biomass including the combustion-retarding material, and the rupturing step is performed before the step of washing the biomass.

Certain embodiments of the present invention may further include a step of air drying the combustion-retarding-material-depleted biomass that is performed before the pyrolyzing step. Drying may be carried out by simply using air, and therefore, drying in some instances may refer to air drying. In preferred embodiments, drying the combustion-retarding-material-depleted biomass further includes a step of conveying the carbon dioxide produced from the pyrolyzing step.

In yet another aspect, the present invention provides a system for producing combustible biomaterial. The system includes: (i) a lignocellulose rupturing device for rupturing lignocellulose in biomass to produce a ruptured biomass material, the ruptured biomass material having a combustion-retarding material; (ii) a washing subassembly designed to wash the ruptured biomass material having a combustion-retarding material with a solvent and produce a combustion-retarding-material-enriched solvent and a combustion-retarding-material-depleted ruptured biomass; and (iii) a pyrolyzing subassembly for pyrolyzing the combustion-retarding-material-depleted ruptured biomass to produce a combustible biomaterial. In preferred embodiments, the inventive system may further include a densifier that is designed to densify the combustible biomaterial to produce biocoal. Preferably, the densifier is a pelletizer designed to produce biocoal pellets.

Inventive systems may further include: (i) a soaking chamber for soaking ruptured biomass in a solvent to produce soaked-ruptured biomass; and (ii) a first connection for conveying the soaked-ruptured biomass to the washing subassembly. In accordance with a preferred embodiment of the present invention, systems may further still include: (i) a drying chamber designed to dry the combustion-retarding-material-depleted ruptured biomass and produce dried-combustion-retarding-material-depleted ruptured biomass; and (ii) a second connection for conveying combustion-retarding-material-depleted ruptured biomass from the washing subassembly to the drying chamber. In certain of these preferred embodiments, inventive systems may further still include a third connection for conveying the dried-combustion-retarding-material-depleted ruptured biomass to the pyrolyzing subassembly.

In yet another aspect, the present invention provides a biomass washing sub-assembly. The biomass washing sub-assembly includes: (i) a plurality of bins, each of which is designed to hold a single discrete amount of biomass; (ii) a solvent dispenser for dispensing solvent at a location from where the solvent washes a first discrete amount of biomass when the first discrete amount of biomass is inside a first of the plurality of bins, to produce a first effluent stream; and (iii) a first pump for pumping the first effluent stream to a location from where the first effluent stream washes a second discrete amount of biomass when the second discrete amount of biomass is inside a second of the plurality of bins, to produce a second effluent stream. Preferably, the second effluent solvent stream has a higher concentration of combustion-retarding material than the first effluent stream. In certain preferred embodiments of the present invention, the solvent dispenser is a spray. Inventive systems may further include a first effluent dispenser connected to the first pump and configured to dispense the first effluent stream. An interior of each of the bins may be coated with an acid resistant material. Systems of the present invention may further still include a conveyer belt that is designed to advance the plurality of bins after concluding washing of at least one of the discrete amount of biomass contained inside one of the plurality of bins.

In accordance with one embodiment of the present invention, systems further still include a plurality of sieves, each of which is located below one of the plurality of bins or fitted to bottom of the one of the plurality of bins. Preferably, inventive systems further still include a plurality of collection chambers, each of which is disposed below one of the plurality of bins and each of which is designed to collect an effluent stream produced from washing of the single discrete amount of biomass. Such inventive systems may further still include a plurality of heaters which are located below some of the plurality of collection chambers, and each of the plurality of heaters are designed to heat the effluent stream produced from washing of the single discrete amount of biomass.

In yet another aspect, the present invention provides a biomass composition derived from rice straw. The composition includes a lignocellulosic material containing no more than about 0.01 weight percent of potassium. In one embodiment, the inventive composition contains no more than about 10 weight percent of water.

In yet another aspect, the present invention provides another biomass composition derived from rice straw. The composition includes a lignocellulosic material containing no more than about 0.01 weight percent of sodium. In one embodiment, the inventive composition contains no more than about 10 weight percent of water.

In yet another aspect, the present invention provides a yet another biomass composition derived from rice straw. The composition includes a lignocellulosic material containing no more than about 0.01 weight percent of chlorides. In one embodiment, the composition contains no more than 10 weight percent of water.

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present invention. It will be apparent, however, to one skilled in the art that the present invention may be practiced without limitation to some or all of these specific details. In other instances, well-known process steps have not been described in detail in order to not unnecessarily obscure the invention.

The present invention recognizes that biomass, as used in conventional systems and processes, is not combustible at high enough temperatures that are necessary for generating energy, because it contains certain combustion-retarding materials. To this end, the present invention provides novel systems, methods, and compositions in connection with the removal of such combustion-retarding materials from the biomass before subjecting it to combustion. By timely and proper removal of such materials, the present invention circumvents the drawbacks of slagging and fouling of the combustors encountered by the conventional systems and processes. As a result, the present invention provides the advantages of significantly higher throughputs and lower capital costs, which are not realized by the conventional systems and methods.

Figure 1:
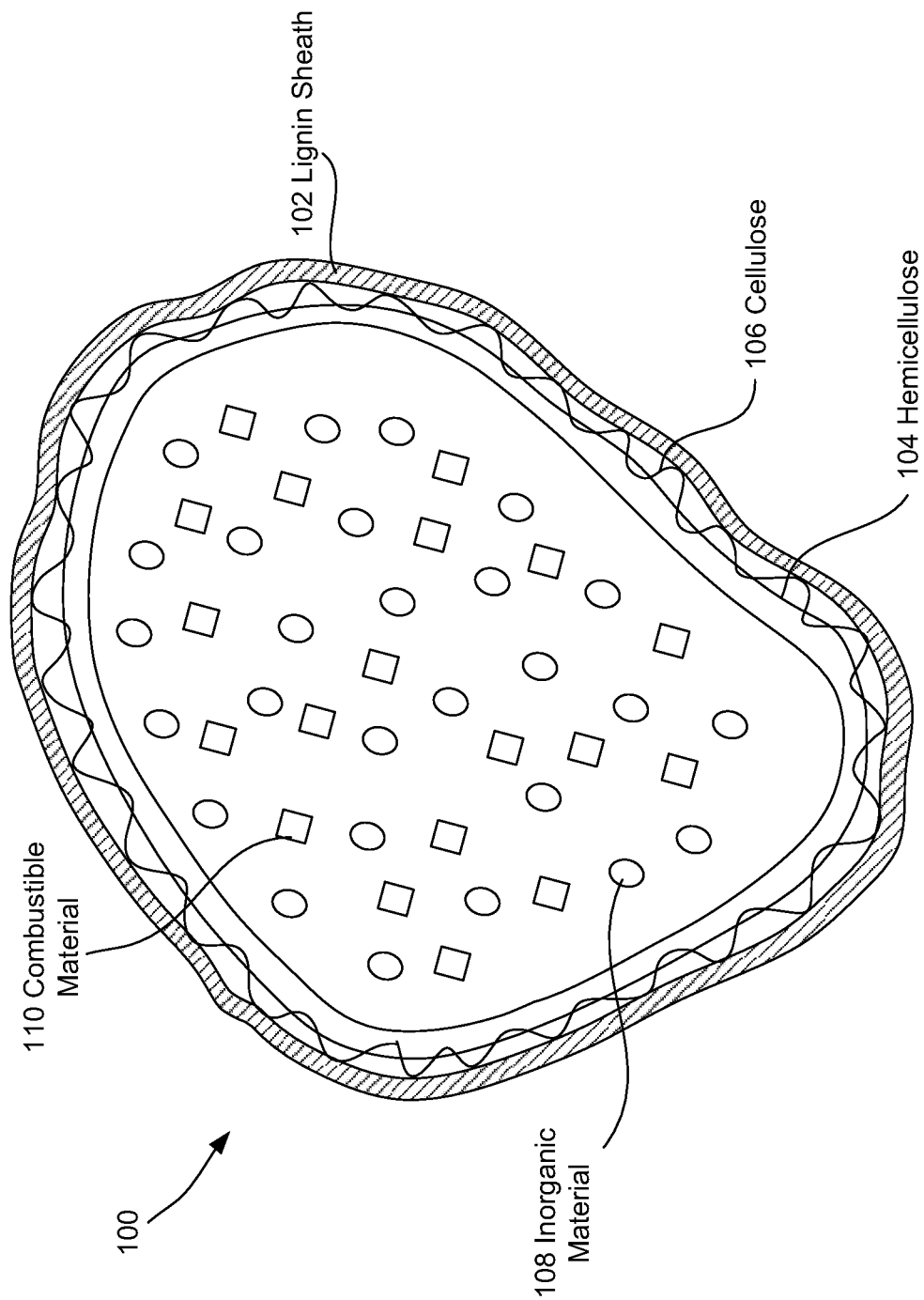
FIG. 1 shows a cross-sectional view of biomass, which is processed according to one embodiment of the present invention.

FIG. 1 shows a typical biomass material 100, which includes a lignin sheath 116, consisting of a rigid non-carbohydrate polymer. Sheath 116 is tightly bound to hemicellulose 114, composed of polysaccharides. Deeper inside biomass 100 and after hemicellulose 114, cellulose 112, also composed of polysaccharides (that can be broken down into glucose), is found. Housed inside barrier 112 is at least one combustible material, and other components such as alkali compounds (e.g., alkali and alkaline earth chlorides, sulfates, carbonates, and complex silicates), potassium and sodium, which the present invention recognizes as non-combustibles or, in the alternative, referred to as combustion-retarding materials 120.

In biomass 100, lignin sheath 116 comprises the outer portion of the plant cell wall, providing a strong protective coating and making inaccessible hemicellulose 114, cellulose 112, combustible glucose 118, and combustion-retarding materials 120. Both hemicellulose 114 and cellulose 112 fortify the protection provided by lignin sheath 116 and make it even more difficult to access the combustible and non-combustible components inside biomass 100. The term "lignocellulose," as used in this specification, refers collectively to lignin sheath 116, hemicellulose 114, and cellulose 112. Thus, lignocellulose houses both combustible and non-combustible components. The present invention provides systems and methods which effectively rupture the lignocellulose to access the combustible 118 and non-combustible 120 components inside biomass 100. By making the combustible 118 and non-combustible 120 components inside biomass 100 accessible, the present invention uses a solvent to effectively remove the non-combustible components 120 from biomass 100. The resulting biomaterial is a combustible product.

The present invention recognizes that in a process designed to remove the non-combustible components 120 from biomass 100, mass transfer, i.e., transfer of non-combustible components 120 that exist in the solid phase inside biomass 100 to an aqueous phase in the solvent, is the rate-limiting step. Relying on conventional wisdom regarding use of solvents to remove soluble components, those skilled in the art may well conclude that in such a removal process, not mass transfer, but solubility limits of non-combustible components 120 in the solvent, is the rate-limiting step. The present invention therefore represents a significant departure from such conventional wisdom. Furthermore, sequence of certain steps in preferred embodiments of the present invention described below are designed to serve the recognition that mass transfer is the rate-limiting step.

Figure 2:
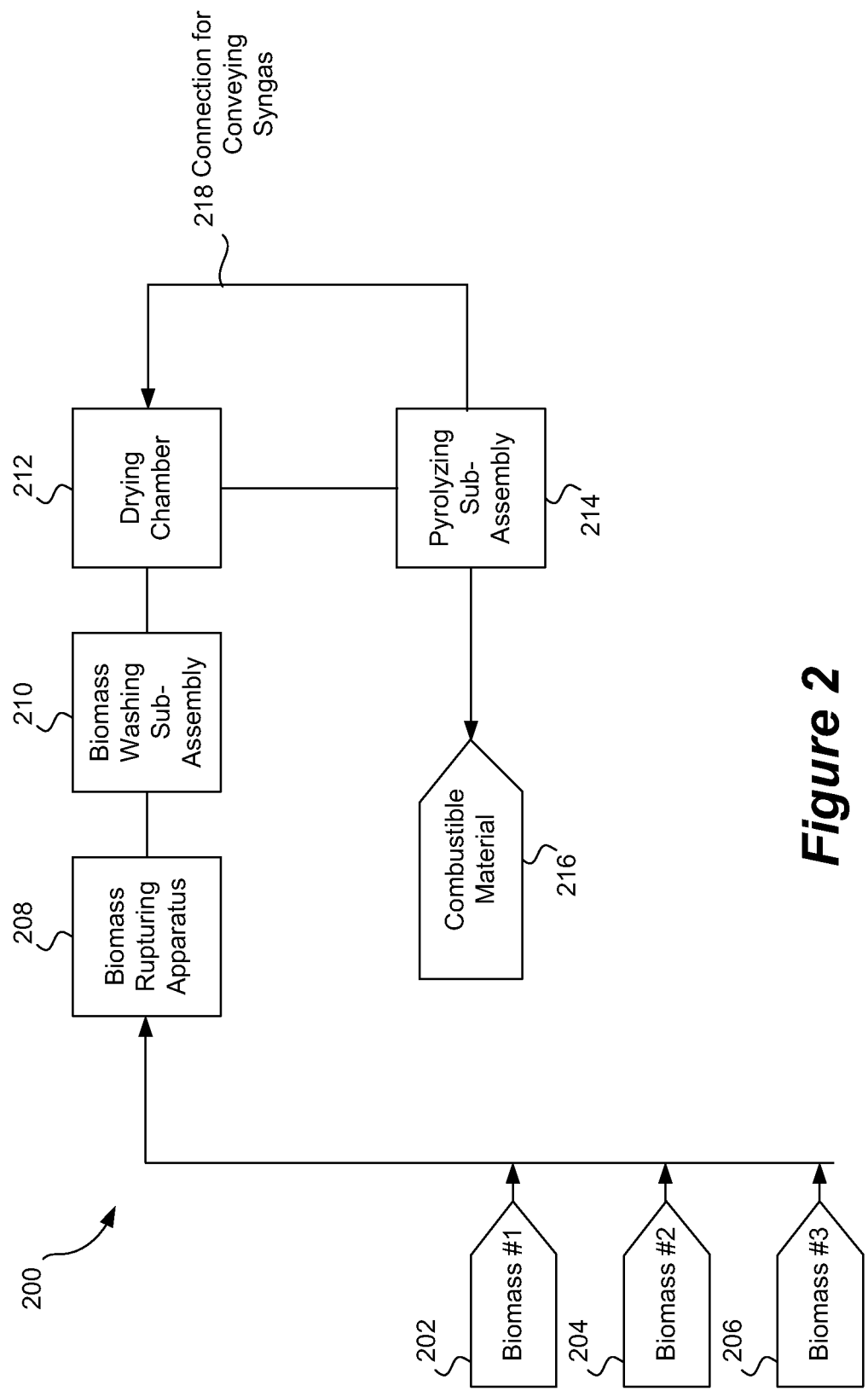
FIG. 2 shows a schematic of a system, according to one embodiment of the present invention, for producing a combustible biomaterial from biomass.

In accordance with one embodiment of the present invention, a system 200 for producing a combustible biomaterial is shown in FIG. 2. System 200 may be implemented to process one or more different types of biomass. As shown in FIG. 2, a first type of biomass 202, a second type of biomass 204, and a third type of biomass 206, are one at a time or are contemporaneously fed inside a biomass rupturing apparatus 208. Inside rupturing apparatus 208, lignocellulose inside biomass is ruptured to produce ruptured biomass. In its ruptured form, the combustible and non-combustible components inside the biomass are no longer confined inside the barrier created by lignocellulose, but are accessible for treatment. The ruptured biomass is conveyed to a washing sub-assembly 210, where it contacts a solvent, which dissolves the non-combustible components and produces a combustion-retarding-material-enriched solvent and a combustion-retarding-material-depleted biomass. It is noteworthy that significant portion of the lignocellulose is not soluble in the solvent. The resulting combustion-retarding-material-depleted biomass, which is still wet from the residual solvent, advances to drying. In certain embodiments, combustion-retarding-material-depleted biomass of the present invention has a consistency of a sludge-like material before it advances to drying.

In a first pass of the combustion-retarding-material-depleted biomass through a drying chamber 212, the biomass is air dried to produce a dried combustion-retarding-material-depleted biomass, which prepares it for pyrolysis. In a pyrolyzing subassembly 214, the dried combustion-retarding-material-depleted biomass is subject to heat treatment in the absence of oxygen to produce a combustible biomaterial and syngas. The syngas includes at least one member selected from a group consisting of $CO$, $CO_2$, $CH_4$, and $H_2$. A connection 218 between pyrolyzing subassembly 214 and drying chamber 212 is designed to convey the syngas to drying chamber 212. In subsequent passes of the combustion-retarding-material-depleted biomass through drying chamber 212, connection 218 allows the syngas to participate in the drying step. In other words, syngas is conveyed from pyrolyzing subassembly 214 through connection to drying chamber 212 to facilitate drying of combustion-retarding-material-depleted biomass. Of particular importance is the ability of this connection to recycle $CO_2$, which is one of the components of syngas. Instead of releasing $CO_2$ into the atmosphere, the present invention uses the $CO_2$ byproduct, which is greenhouse gas whose emission requires high capital expenditure for environmentally compliant remediation. As a result, the systems and processes of the present invention not only provide a combustible biomaterial at high throughputs, they also provide a low cost combustible bio-based product whose production minimizes reduction of harmful greenhouse gases.

In preferred embodiments of the present invention, the dried sludge undergoes densification. By way of example, a densifier 216, as shown in FIG. 2, is used to densify the combustible biomass and produce a densified combustible biomaterial. Preferably, densifier 216 is a pelletizing apparatus, which is capable of densifying a combustible biomaterial having a consistency of a dried-sludge material, used to produce combustible biomaterial in the form of pellets, which are easily transported and stored and used as an energy source.

Although system 200 shows an input of three different types of biomass, alternative embodiments of the present invention may similarly process less than three or more than three different types of biomass. It is noteworthy that the present invention therefore advantageously produces combustible biomaterial using different types of agricultural residue. Furthermore, regardless of the type of agricultural residue used, the present invention provides consistent gross calorific values for the ultimately produced combustible biomaterial. Thus, the present invention provides systems and methods to generate consistent and predictable amounts of energy from a very diverse range of agricultural residues, which are available in a geographic area during a particular season.

Biomass 202, 204, and 206 may be any type of agricultural residue containing combustion-retarding materials confined within a barrier created by lignocellulose. System 100 is designed to process biomass which includes at least one member selected from a group consisting of rice straw, sugar cane leaves, cotton stalks, mustard stalks, pine needles, coffee husks, coconut husks, rice husks, mustard husks, weed straw, corn stover, sugar cane bagasse, millet stalks, pulses stalks, sweet sorghum stalks, nut shells, animal manure, guar husk, acacia totalis, julia flora, jatropha residue, wild grass, pigeon beans, pearl millet, barley, dry chili, gran jowar, linseed, maize/corn, lentil, mung bean, sunflower, til, oil seed stalks, pulses/millets, black gram, sawan, soybean stalks, cow gram, horse gram, finger millet, turmeric, castor seed, meshta, sannhamp, and hemp. Wood or certain derivatives of wood are combustible and, therefore, do not contain combustion-retarding material, as contemplated by the present invention. Furthermore, wood is not agricultural residue, as that term is used in the specification.

Biomass rupturing apparatus 208 may be a commercially available chopper, crusher, smasher, pulverizer, or the like, well known to those skilled in the art. Although preferred embodiments of the present invention contemplate using mechanical means, chemical means may well be employed to attack and rupture the lignocelluloses in biomass. So long as the lignocelluloses are ruptured and a greater surface area of the combustible and non-combustible components is exposed, any means, whether mechanical or chemical is acceptable. In more preferred embodiments of the present invention, however, rupturing takes place along the lignocellulose fiber, as opposed to rupturing across those fibers, to expose even a greater surface area of the biomass.

Washing sub-assembly 210 is designed to remove combustion-retarding materials from the biomass during washing. Non-combustible components or combustion-retarding materials, as these terms are used interchangeably herein, include at least one member selected from a group consisting of alkali and alkaline earth chlorides, sulfates, carbonates, and silicates. Washing can be accomplished by any technique that contacts the ruptured biomass with a solvent. By way of example, washing can be accomplished by submerging or soaking the biomass in a solvent. In preferred embodiments of the present invention, however, washing is carried out using a subassembly 300 shown in FIG. 3, which is explained in greater detail below.

Drying chamber 212 is a chamber which is configured to dry combustion-retarding-material-depleted biomass with air and syngas. In a first pass of combustion-retarding-material-depleted biomass through drying chamber 212, when syngas has not yet been produced in pyrolyzing subassembly 214, combustion-retarding-material-depleted biomass is air dried to remove moisture. During a subsequent pass or subsequent passes of combustion-retarding-material-depleted biomass through the pyrolyzing sub-assembly 214, however, syngas produced in pyrolyzing subassembly 214 is conveyed to drying chamber 212 for removing moisture as part of the drying process.

A pyrolyzing sub-assembly 214 is capable of heating dried combustion-retarding-material-depleted biomass in the absence of oxygen to produce a combustible biomaterial. Pyrolyzing subassembly 214 can be any apparatus that effectively degrades long-chain polymers of hemicellulose and cellulose into a simpler form (e.g., glucose), which can be converted to energy under high-temperature conditions disclosed by the present invention. By way of example, the pyrolyzing sub-assembly 214 may be a boiler or a combustor well known to those skilled in the art and operating at a temperature that is between about 100° C. and about 500° C. In the absence of oxygen, pyrolysis, according to the present invention, ensures that the carbon content in the resulting combustible biomaterial will not react with oxygen to form hydrocarbon or ash. Rather, the biomass undergoing pyrolysis creates activated carbon bonds, which provides for an energy-dense end product and increases the gross calorific value of the combustible biomaterial. According to the present invention, the gross calorific value of the combustible biomaterial after pyrolyzing goes up by a factor that is between about 7 and about 10 times compared to before pyrolyzing.

Furthermore, pyrolyzing sub-assembly 214 is configured to drive away moisture from the combustible biomaterial to produce combustible material that is hydrophobic. Energy-dense and hydrophobic biomaterials represent preferred embodiments of the inventive biomaterials because they are stable, well-suited to transport over long distances, and lend themselves to being conveniently stored for long periods of time.

In certain preferred embodiments, inventive biomass systems, such as system 200, include a soaking chamber, which is disposed between rupturing apparatus 208 and washing sub-assembly 210. Ruptured biomass is soaked in a solvent contained inside this chamber before the ruptured biomass undergoes washing.

In accordance with certain preferred embodiments of the present invention, system 208 also includes a screw-press, which is positioned after washing sub-assembly 210 for pressing out the residual moisture remaining in combustionretarding-material-depleted biomass, to prepare that biomass for drying inside drying chamber 212.

Figure 3:
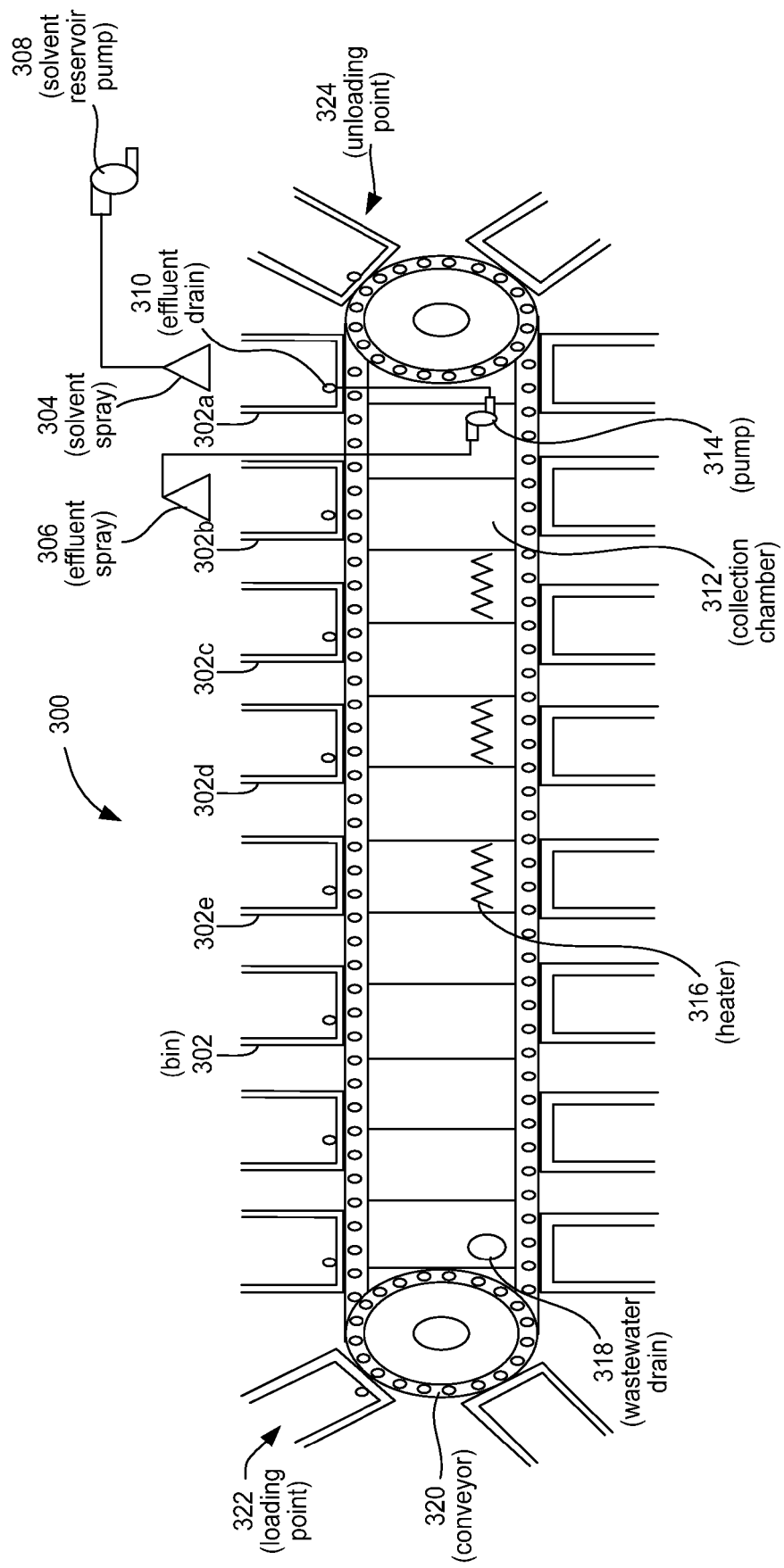
FIG. 3 shows a side-sectional view of a washing subassembly, according to one preferred embodiment of the present invention, for washing biomass to remove combustion-retarding materials therefrom.

In a preferred embodiment, inventive washing sub-assemblies, an example of which is denoted by reference numeral 210 as shown in FIG. 2, include a multiple bin sub-assembly 300 as shown in FIG. 3. Sub-assembly 300 includes a plurality of bins 302 (e.g., a representative number of them are shown as 302a, 302b, 302c, 302d, 302e). Each bin is designed to receive a discrete amount of biomass (e.g., ruptured biomass as discussed in connection with FIG. 1). According to this embodiment of the present invention, a large amount of biomass is processed by dividing and processing it in relatively smaller discrete amounts, with each such amount contained inside a bin (e.g., bin 302a). Bins 302 are driven on a conveyer belt 320 from a loading point 322 to an unloading point 324 and then back to loading point 322. Washing of biomass by a solvent takes place when bins traverse from loading point 322 to unloading point 324. A solvent reservoir pump 308 pumps a solvent to a solvent spray 304, from where it is dispensed for washing a discrete amount of biomass contained within a bin. By way of example, when bin 302a is traversing from loading point 322 to unloading point 324 and it arrives at a location under spray 304, the solvent is dispensed from spray 304 for washing a discrete amount of biomass contained inside bin 302a. After washing of the biomass inside bin 302a has concluded, bin 302b advances to a position under spray 304 so that the biomass contained inside that bin can similarly undergo washing by solvent. In this manner, biomass contained inside each bin is washed by the solvent.

An effluent stream resulting from solvent washing of a discrete amount of biomass contained in a bin, as described above, flows through an effluent drain 208 and is used for subsequent washing of another discrete amount of biomass contained inside another bin. By way of example, after biomass in bin 302a undergoes washing, the resulting effluent stream is collected inside a collection chamber 312, from where it is pumped using an effluent pump 314 to an effluent spray 306, which dispenses the effluent for washing the biomass in bin 302b. In this manner, biomass inside a bin located downstream is washed with the effluent produced from washing of biomass inside a bin located upstream. In preferred embodiments of the present invention, not all, but certain ones of collection chamber 312, come fitted with heaters to make sure that the effluent stream is maintained at a desirable temperature for effective washing of biomass. According to the embodiment shown in FIG. 3, the last collection chamber conveys the effluent stream for effluent treatment through an opening 318.

Bin 302 may be any commercially available receptacle capable of holding a discrete amount of biomass. Bin 302 comes fitted with or has disposed below its bottom surface a sieve. The sieve has appropriately sized pores that hold back sufficiently large biomass particles that may hinder the operation of a downstream effluent pump 314. Although bin 302 is made from any rigid material strong enough to hold relatively large quantities of biomass, it is preferably made from a material that is also unreactive to an acidulated solvent (e.g. stainless steel). In more preferred embodiments of the present invention, however, an interior portion of bin 302 is coated with a material that is unreactive to an acidulated solvent, as this provides a more cost-effective solution than manufacturing entire bin 302 from an expensive material, such as stainless steel.

Solvent reservoir 308, in accordance with one embodiment of the present invention, stores solvent. In preferred embodiments of the present invention, solvent inside reservoir 308 is acidulated water having a pH that is between about 4 and about 7. As such, in these embodiments, solvent reservoir, like the bins described above, may be composed of any material that will not react with the acidulated water. The acidulated water composition preferably includes $H_2SO_4$, as it is relatively easily neutralized compared to other acidic compounds.

The use of bins to separate solvent from the treated biomass represents a marked improvement over conventional techniques of effecting such a separation. Specifically, well-known techniques, such as reverse osmosis or filtration, which may be employed to separate treated biomass and solvent, are labor-intensive and time-consuming. Use of bins, according to the present invention, treats the biomass with the solvent and contemporaneously separates the treated biomass form the solvent, without incurring the high costs associated with conventional techniques of effecting such a separation.

Figure 4:
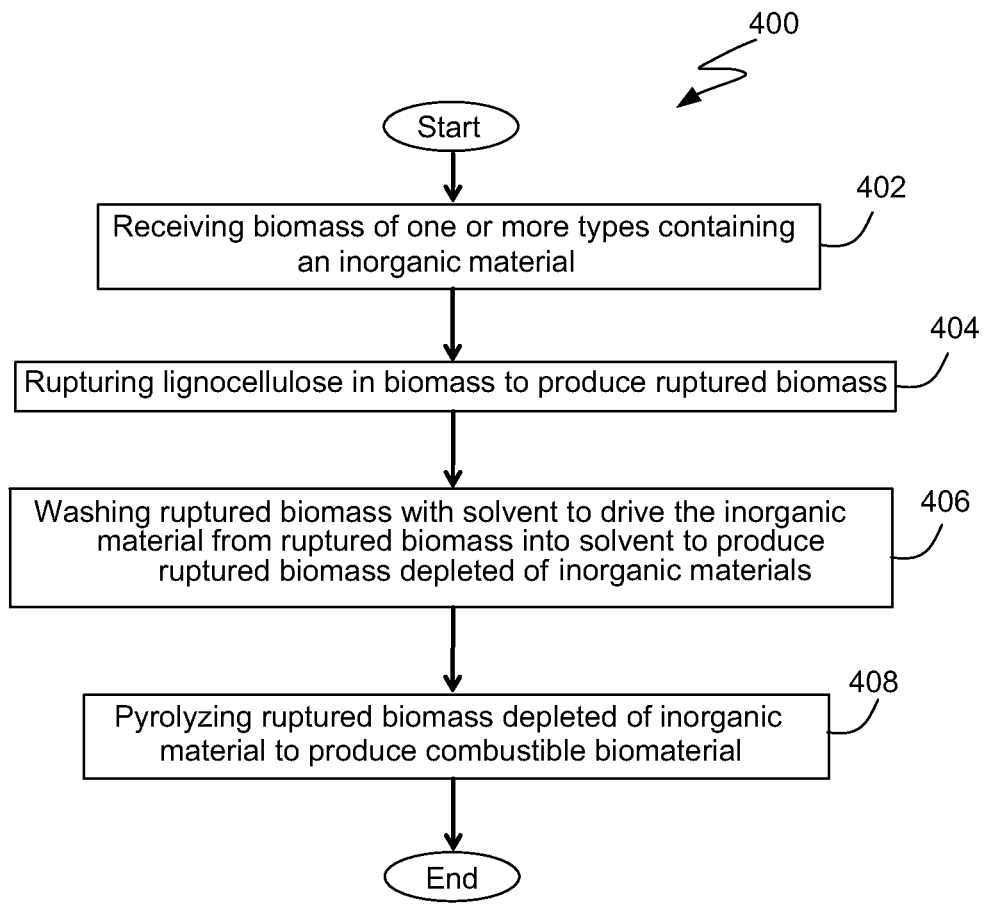
FIG. 4 is a flowchart of a process, according to one embodiment of the present invention, for producing a combustible biomaterial from biomass.

Washing Subassembly 310, as shown in FIG. 3, can be implemented in a variety of different ways. FIG. 4 shows a process 400, according to one preferred embodiment of the present invention, for washing (which can be carried out in subassembly 310) one or more types of agricultural residue or biomass (as these terms are used interchangeable in this specification). Agricultural residue or biomass referred to in this specification includes combustion-retarding materials. Process 400 begin when in a step 402, one or more types of biomass containing combustion-retarding materials is received. By way of example, step 402 includes one or more types of different agricultural residue being delivered in trucks.

Next, step 404 includes rupturing lignocellulose in the biomass to produce ruptured biomass. By way of example, biomass rupturing apparatus 108, as shown in FIG. 1, is used to rupture and produce ruptured biomass. As described above, in this step, surface area of the biomass is increased by rupturing, resulting in exposure of active sites for solubilization of combustion-retarding materials in the subsequent washing step 306.

In step 406, the present invention provides a step of washing ruptured biomass with a solvent to drive combustion-retarding materials from ruptured biomass to solvent (e.g., the same solvent described in solvent reservoir 308) and produce combustion-retarding-material-depleted biomass and combustion-retarding-material-enriched solvent.

The present invention recognizes that temperature, residence time, and pH are important parameters to consider for effectively performing step 406. In preferred embodiments of the present invention, washing step 406 preferably uses a solvent and effluent streams maintained (e.g., using heaters 316 of FIG. 3) at a temperature that is between about 30° C. and about 70° C., and more preferably, at about 50° C. At these temperatures, combustion-retarding materials undergo a phase shift that facilitates their leaching from a solid phase, as they exist in biomass, into an aqueous phase, as they are found in the solvent after washing.

In certain embodiments of the present invention, the parameters of washing step 306 are set to account for the type of biomass material washed. In particular, lignin-enriched biomass material (e.g., cotton stalks, rice stalks, or mustard stalks) requires a higher concentration of acidic solvent. If the solvent is too acidic, however, then the lignocellulosic material will dissolve along with the combustion-retarding material. Should this happen, it is extremely difficult and expensive to separate the combustion-retarding material from the lignocellulosic material. As a result, the present invention recognizes the need to strike a delicate balance in selecting the proper pH of the solvent for effective washing of the biomass.

Temperature impacts rate of mass transfer of the combustion-retarding materials from the solid phase in the biomass to the aqueous phase in the solvent. Higher temperatures agitate the combustion-retarding material, making it more mobile to facilitate mass transfer. If the temperature is not high enough, then the transfer of the combustion-retarding materials from the solid phase to the aqueous phase is relatively slow and does not provide maximum throughput. On the other hand, if the temperature is too high, then process 400 runs the risk of converting the hemicellulose and cellulose fibers into simple sugars, like glucose, that become soluble in water, and therefore does not provide the desired yield. Similar to the above-discussion regarding selection of the proper pH, the present invention recognizes that it is also important to strike a balance when setting the temperature of the solvent during washing step 406. By way of example, the temperature of solvent can be any value that is between about 30° C. and about 70° C. In preferred embodiments of the present invention, however, the temperature is about 50° C.

During step 406, biomass should contact the solvent for sufficiently long periods of time to facilitate mass transfer, but so long as to break down the hemicellulose and cellulose fibers to simple sugars, which are soluble in the solvent. In this context, the present invention recognizes that an appropriate residence time of the biomass in the solvent that maximizes mass transfer depends on the amount of lignin present in the biomass. The present invention recognizes that a lignin-rich biomass, such as cotton straws, should have a residence time that is between about 2 hours and about 4 hours to breakdown the hemicellulose and cellulose layers and allow for mass transfer. Rice or mustard straws, which are not as lignin rich as cotton straws, should have a residence time of between about 1 hour and about 1.5 hours. Against this backdrop, rice and mustard husk, which may be thought of as lignin-poor, have a residence time that is about 30 minutes. As a result, depending on the amount of lignin present in the biomass, residence times according to the present invention can be a value that is between about 30 minutes and about 4 hours.

Referring back to process 400 in FIG. 4, after washing step 406 concludes, a step 408 of pyrolysis is carried out on the resulting combustion-retarding-material-depleted biomass to produce a combustible material. At this stage of process 400, the combustion-retarding-material-depleted biomass, which may have the consistency of sludge-like material, undergoes pyrolysis in the absence of oxygen. Pyrolysis drives away moisture from the combustion-retarding-material-depleted biomass to produce an energy-dense and hydrophobic combustible biomaterial.

The present invention recognizes that both temperature and treatment time are important parameters during pyrolysis to achieve a high throughput and the requisite yield. By way of example, the temperature during pyrolysis is a value that is between about 100° C. and about 500° C., and preferably a value that is between about 250° C. and about 350° C. The time of treatment is a value that is between about 10 minutes and about 24 hours.

In certain preferred embodiments, inventive biomass processes, such as process 400, include a step of soaking that is carried out after rupturing step 404 and before washing step 406.

In this step, ruptured biomass is soaked in a solvent before it undergoes washing. The ruptured biomass may soak in the solvent for a duration that is between about 30 minutes and about 60 minutes.

In accordance with certain preferred embodiments of the present invention, process 400 also includes a pressing step, which is performed after washing sub-assembly 210. In the pressing step, the residual moisture remaining in combustion-retarding-material-depleted biomass is pressed out to prepare that biomass for a subsequent drying step. Drying of the combustion-retarding-material-depleted biomass takes place at a temperature that is between about 20° C. and about 50° C. and for a duration that is between about 10 minutes and 48 hours.

The present invention also recognizes that rupturing step 404 plays a significant role, not only in facilitating mass transfer during washing step 406, as mentioned above, but also during the subsequent pyrolyzing step 408. Specifically, the biomass with increased surface area, resulting from rupturing step 404, undergoes pyrolysis to create a uniform distribution of moisture-retardant sites from moisture-absorbent sites. As a result, the present invention not only produces a biomaterial that is combustible, but also one that undergoes combustion in a homogeneous manner. The combustible biomaterial, according to the present invention, therefore, combusts in a predictable manner and realizes higher yields, both of which make it a desirable renewable fuel source.

Furthermore, the increased surface area of the ruptured biomass also facilitates heat transfer during pyrolyzing step 408. Heat is more easily transferred inside ruptured biomass during pyrolyzing step 408 to effectively remove moisture. In the absence of a previous rupturing step, a significant amount of heat is wasted on rupturing the lignocellulosic structure in the biomass during pyrolysis. The present invention avoids such waste, and instead utilizes a significant amount, if not almost all, of the heat available during pyrolysis to effectively produce a combustible biomaterial. Consequently, a rupturing step, which precedes a washing step and a pyrolysis step, serves both to facilitate mass transfer and heat transfer.

Figure 5:
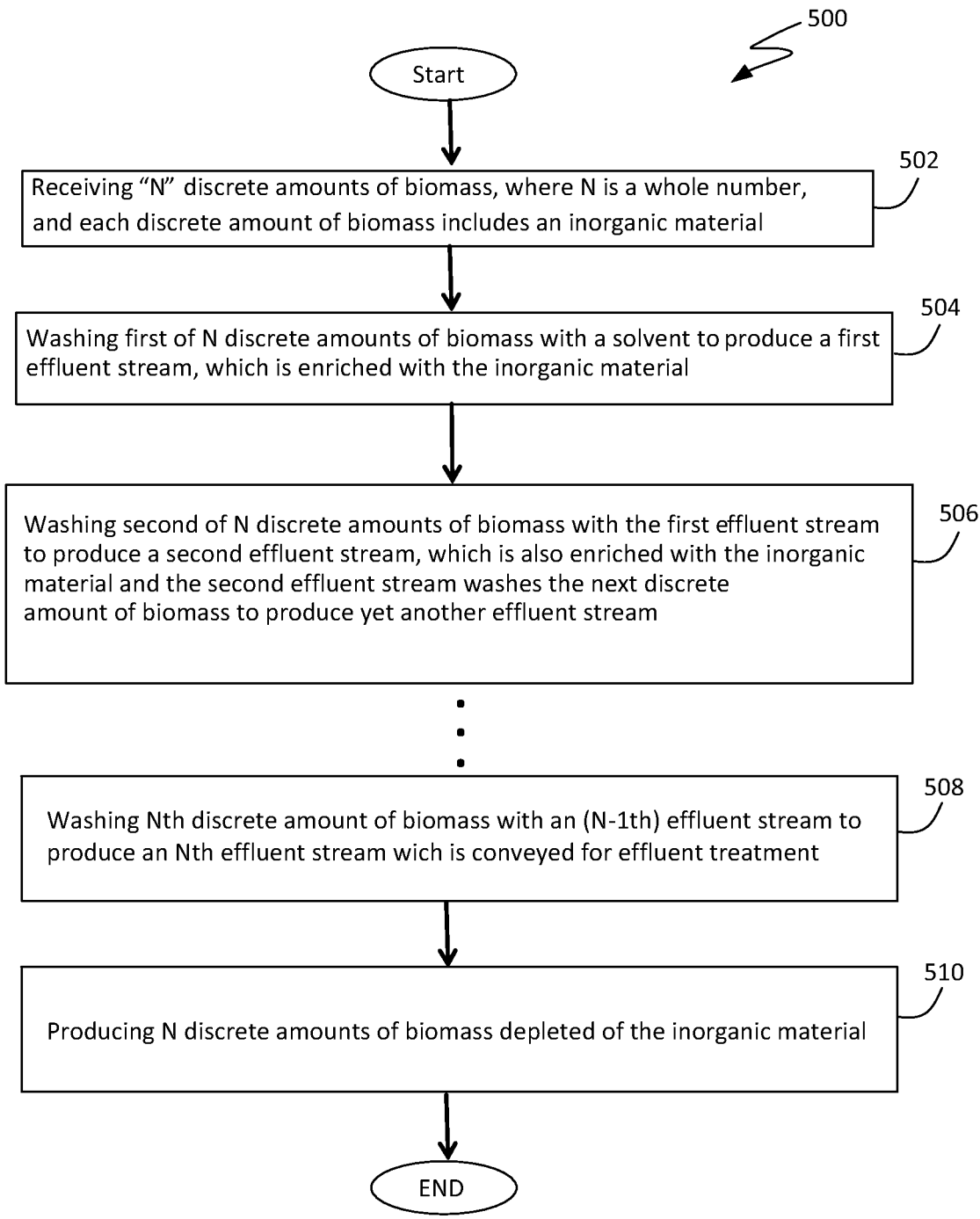
FIG. 5 is a flow chart showing a washing step, according to one preferred embodiment of the present invention, described in the process of FIG. 4.

Not only does the present invention conserve energy, it also conserves solvent. To this end, FIG. 5 shows a flowchart depicting a process 500 for washing relatively large amounts of biomass with a relatively small amount of solvent. In accordance with one embodiment of the present invention, a large amount of biomass is divided into small, discrete amounts of biomass. Specifically, step 502 includes receiving "N" discrete amounts of biomass, where N is a whole number and the biomass includes a combustion-retarding material. In a next step 504, a first of N discrete amounts of biomass undergoes washing with a solvent to produce a combustion-retarding-material-depleted biomass and a first effluent that is enriched with combustion-retarding materials. Then, in step 506, a second of N discrete amounts of biomass undergoes washing by the first effluent to produce a second effluent, which is used to wash the third of N discrete amounts of biomass. In this manner, the effluent stream produced from washing one discrete amount of biomass is used for subsequently washing another discrete amount of biomass and so on until the washing proceeds to washing the Nth discrete amount of biomass. According to step 508, the Nth discrete amount of biomass is washed with the (N−1)th effluent stream to produce an Nth effluent stream, which in certain preferred embodiments of the present is sent for effluent treatment. Process 500, starting from step 502 to step 508, can be thought of as a single washing cycle. According to step 510, a single washing cycle, as described above, produces N discrete amounts of biomass depleted of combustion-retarding materials.

Figure 6:
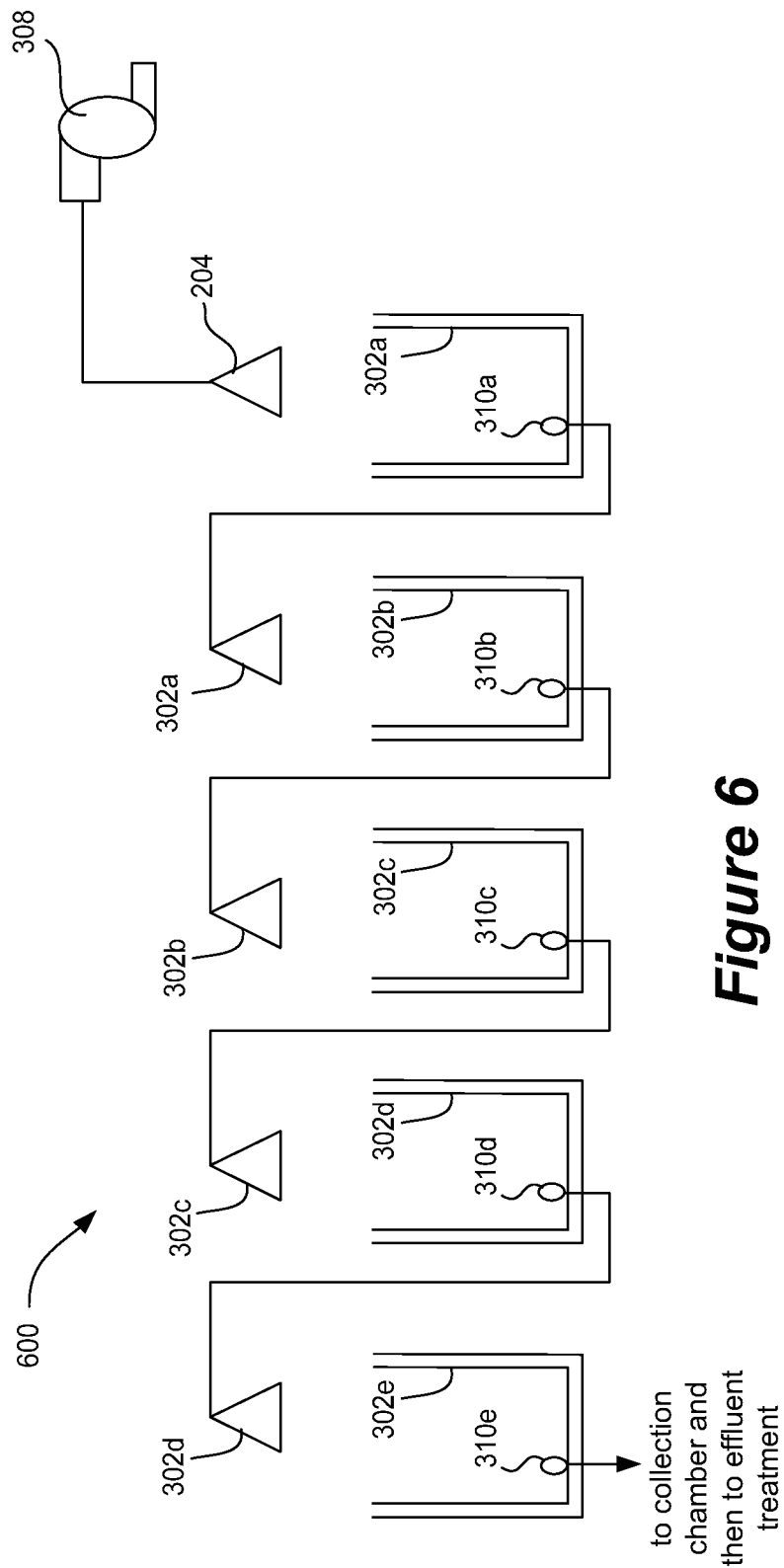
FIG. 6 shows a side-sectional view of a part of washing subassembly of FIG. 3, which may be implemented to carry out the washing step of FIG. 5.

FIG. 6 shows a subsystem 600, which is a portion of system 200 of FIG. 2. Subsystem 600 is configured to carry out a single washing cycle for an exemplar embodiment, where N equals to 5. In FIG. 6, each of five bins 202a, 202b, 202c, 202d and 202e receive a discrete amount of biomass. When first discrete amount of biomass inside bin 202a is positioned under spray 204, a solvent pump 208 pumps solvent and dispenses it through a first spray 204a to wash the first discrete amount of biomass. A resulting first effluent exits bin 202a through opening 210a and is pumped by a pump 214a to a second spray 204b, which then dispenses the first effluent to wash a second discrete amount of biomass inside second bin 202b. Using similar components, as used in the configuration to wash a first discrete amount of biomass, a second opening 210b and a pump 214b transport the resulting second effluent to a third spray 206c. In this manner, effluents resulting from prior washings are used to wash subsequent discrete amounts of biomass in bins 206c, 206d, and 206e. These effluent streams are guided to perform such washings using openings 210c, 210d, and 210e, and pumps 214c, 214d, and 214e. Washing discrete amounts of biomass in each of five bins 202a, 202b, 202c, 202d, and 202e in this manner can be thought of as a single washing cycle.

It is noteworthy that when one effluent stream washes a discrete amount of biomass to produce another effluent stream, which in turn washes another discrete amount of biomass to produce a yet another effluent stream, it is reasonable to conclude that the effluent streams resulting from successive downstream washing steps are progressively more enriched with combustion-retarding materials. In other words, it is reasonable to conclude that the second effluent stream is enriched with combustion-retarding materials to a greater extent than the first effluent stream. Similarly, the third effluent stream may be enriched with combustion-retarding materials to a greater extent than the second effluent stream. However, the present invention recognizes that with each washing of a discrete amount of biomass, the drained effluent becomes progressively more enriched with combustion-retarding materials. Those skilled in the art will recognize that the inventive washing process does not result in diminished washing efficiency (i.e., inability of the solvent to extract combustion-retarding materials from biomass); rather, the progressively enriched effluent streams still maintain the ability to solubilize combustion-retarding materials.

Figure 7:
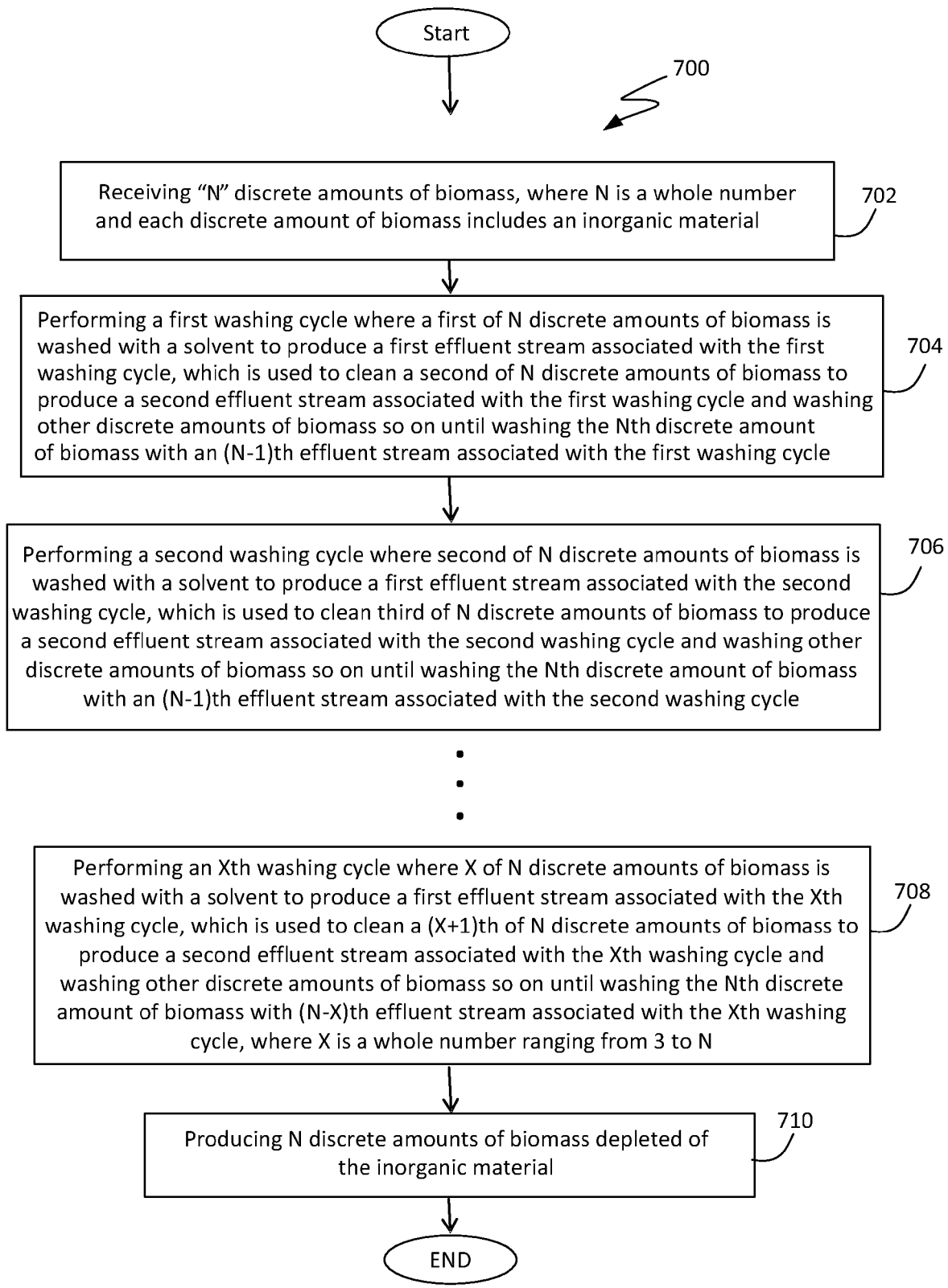
FIG. 7 is a flowchart showing a washing step, according to another preferred embodiment of the present invention, that is described in the process of FIG. 4 and that implements multiple washing cycles to wash a discrete amount of biomass.

Although a single washing cycle, such as the one described above, provides an effective way to remove combustion-retarding materials, multiple washing cycles as described below represent a more preferred embodiment of the present invention. FIG. 7 is a flowchart of a process 700, in which multiple washing cycles are performed. As it is described below, this figure reflects an understanding that if discrete amounts of biomass contained inside downstream bins are washed with effluents that are progressively more enriched with combustion-retarding materials, then biomass inside downstream bins are not going to be washed as effectively as the biomass in upstream bins because it is likely that the biomass in downstream bins will absorb some of the combustion-retarding materials previously leached out from washing of biomass in upstream bins. Multiple washing cycles, as envisioned in the present invention, ensure that such absorption of combustion-retarding materials by biomass in downstream bins is avoided. In multiple washing cycles, each of a plurality of discrete amounts of biomass is washed with effluents, which are relatively less enriched with combustion-retarding materials, and then is ultimately washed with a solvent.

In one embodiment, process 700 of the present invention begins at step 702 when N discrete amounts of biomass are received and the biomass contains combustion-retarding materials. In step 704, a first washing cycle is performed. The first washing cycle is substantially similar to steps 504, 506, and 508, as described with respect to FIG. 5. Thus, N discrete amounts of biomass undergo washing in the first cycle. The various resulting effluent streams (e.g., from the first effluent to the (N−1)th effluent) are associated with the first washing cycle.

Next, step 706 includes a second washing cycle, which is substantially similar to the first washing cycle, except instead of washing first of N discrete amounts of biomass with the solvent, the second of N discrete amounts of biomass undergoes washing with the solvent. Consistent with this understanding, the various resulting effluent streams (e.g., from the first effluent to the (N−1)th effluent) are associated with the second washing cycle.

According to step 708, an Xth washing cycle is performed so that the Xth of N discrete amounts of biomass undergoes washing with the solvent, where X is a whole number that ranges from 3 to N. In this step, a resulting first effluent associated with the Xth washing cycle is used for washing (X+1)th of N discrete amount of biomass to produce a second effluent associated with the Xth washing cycle. Furthermore, washing is performed in successive discrete amounts of biomass in this manner in this step until the Nth discrete amount of biomass is washed with (N−X)th effluent associated with the Xth washing cycle, where X is a whole number ranging from 1 to N. Finally, step 710 results in N discrete amounts of biomass depleted of combustion-retarding materials.

Figure 8:
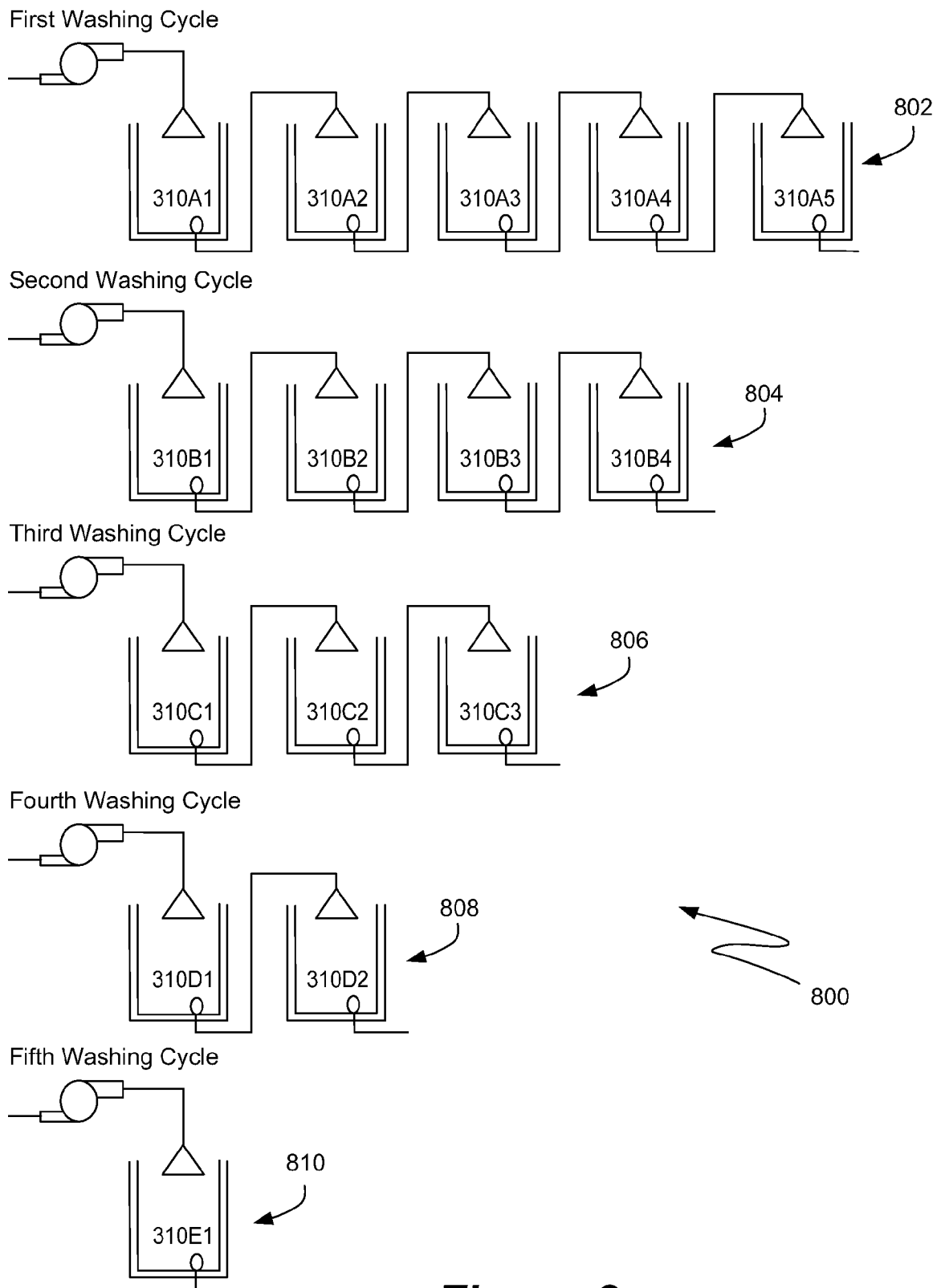
FIG. 8 shows a side-sectional view of a part of washing subassembly of FIG. 3, which may be implemented to carry out the washing step of FIG. 7.

FIG. 8 shows a subsystem 800, which is a portion of system 300 of FIG. 3, and is simplified to facilitate discussion. Subsystem 800 is configured to carry out a single washing cycle for an exemplar embodiment where N equals to 5. In FIG. 8, each of five bins 302a, 302b, 302c, 302d, and 302e receive a discrete amount of biomass and each such bin leads a first washing cycle 802. As shown in FIG. 8, bin 302(a) undergoes washing by a solvent and leads the first washing cycle. Similarly, when bins 302(b), 302(c), 302(d), and 302(e) undergo washing by a solvent, they lead a second 804, a third 806, a fourth 808, and a fifth 810 washing cycle, respectively. The term "washing cycle," as used in this specification, does not refer to a discrete washing cycle, rather it is a continuous process designed to ensure that biomass in downstream bins is washed with effluents that are progressively less enriched with combustion-retarding materials, and biomass in these bins is ultimately washed by the solvent.

Regardless of whether single or multiple washing cycles are used, the combustion-retarding-material-depleted biomass is sent to pyrolysis to produce a combustible material as explained above. In accordance with one embodiment, a single washing cycle of the present invention washes between about 1 metric ton and about 1000 metric tons of biomass. In this embodiment, between about 1000 liters and about 40 mega-liters of solvent is used. Biomass, which undergoes washing in a single washing cycle, may be divided into between about 10 discrete amounts of biomass and about 1000 discrete amounts of biomass. Each such discrete amount of biomass may be washed with a volume of solvent that is between about 0.5 liters and about 4 mega-liters.

Relying on conventional wisdom, those skilled in the art would recognize that to wash significantly large amounts of biomass, a proportionately large amount of solvent is necessary. However, based on the recognition that mass transfer is the rate-limiting step for removal of combustion-retarding materials from biomass, the present invention represents a marked departure from such wisdom and recognition as it provides systems (e.g., system 300 shown in FIG. 3) and processes (e.g., processes 500 and 700 shown in FIGS. 5 and 7, respectively) that allow significantly large amounts of biomass to be washed with relatively small amounts of solvent. Dividing a significantly large amount of biomass into smaller discrete amounts that are contained inside bins and successively washing such discrete amounts of biomass with effluent streams resulting from numerous previous washing steps consumes a relatively small amount of solvent. Conservation of resources, such as conserving large volumes of solvent, translates into an inexpensive solution to meet the growing demand for energy.

The present invention also offers biomass compositions (i.e., containing a lignocellulosic material) that are combustible. By way of example, before a washing step (e.g., washing step 406 in FIG. 4) is carried out, a composition of ruptured rice straw includes about 0.2 weight percent potassium and has no more than about 10 weight percent water. After the washing step concludes, the amount of potassium in the washed rice straw is reduced by a factor of 20 compared to the amount of potassium in the rice straw before washing. In other words, the rice straw includes about 0.01 weight percent of potassium. At this stage, however, the rice straw content is moisture rich and includes about 50 weight percent water.

After a drying step (e.g., which is carried out in a drying chamber 212 of FIG. 2) is performed on the washed rice straw composition, the potassium content remains substantially similar to the potassium content in the rice straw before the drying step, but the moisture content reduces to about 10 weight percent.

In the methods and systems according to the present invention, the amount of other non-combustible biomass components other than potassium, such as sodium and chlorides, may well be reduced. By way of example, before a washing step (e.g., washing step 406 in FIG. 4) is carried out, a composition of ruptured rice straw includes about 0.1 weight percent. After the washing step concludes, the amount of sodium in the washed rice straw is reduced by a factor of 10 compared to the amount of sodium in the rice straw before washing. In other words, the rice straw includes about 0.01 weight percent of sodium. As another example, after washing the rice straw, the amount of chlorides in the washed rice straw is similarly reduced by a factor of 10 compared to the amount of chlorides in the rice straw before washing. In other words, the rice straw includes about 0.01 weight percent of sodium.

Although illustrative embodiments of this invention have been shown and described, other modifications, changes, and substitutions are intended. By way of example, the present invention discloses removal of combustion-retarding materials; however, it is also possible to remove a single combustion-retarding material using the systems, processes, and compositions of the present invention. Accordingly, it is appropriate that the appended claims be construed broadly and in a manner consistent with the scope of the disclosure, as set forth in the following claims.

What is claimed is:

1. A composition of treated biomass material, comprising:
   a lignocellulosic material; and
   potassium comprising not more than about 0.01% (by weight) of said composition.

2. The composition of biomass material in claim 1, wherein said composition comprises not more than 10% of water, by weight.

3. The composition of claim 1, wherein a heat value of said biomass material is between about 15,000 kJ/kg and about 20,000 kJ/kg.

* * * * *